(12) United States Patent
Pokrass et al.

(10) Patent No.: US 10,591,596 B2
(45) Date of Patent: Mar. 17, 2020

(54) DOPPLER RESOLUTION IMPROVEMENT IN LOW-DUTY CYCLE TRANSMISSION

(71) Applicant: GM GLOBAL TECHNOLOGY OPERATIONS LLC, Detroit, MI (US)

(72) Inventors: Alexander Pokrass, Bat Yam (IL); Igal Bilik, Rehovot (IL); Moshe Laifenfeld, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 15/592,690

(22) Filed: May 11, 2017

(65) Prior Publication Data
US 2018/0329054 A1    Nov. 15, 2018

(51) Int. Cl.

| | |
|---|---|
| G01S 13/93 | (2006.01) |
| G01S 13/931 | (2020.01) |
| G01S 7/292 | (2006.01) |
| G01S 7/35 | (2006.01) |
| G01S 13/26 | (2006.01) |
| G01S 13/34 | (2006.01) |
| G01S 13/30 | (2006.01) |
| G01S 13/58 | (2006.01) |

(52) U.S. Cl.
CPC .......... *G01S 13/931* (2013.01); *G01S 7/2923* (2013.01); *G01S 7/354* (2013.01); *G01S 13/26* (2013.01); *G01S 13/30* (2013.01); *G01S 13/343* (2013.01); *G01S 13/584* (2013.01); *G01S 2007/356* (2013.01)

(58) Field of Classification Search
CPC ...................................................... G01S 7/2923
See application file for complete search history.

(56) References Cited

U.S. PATENT DOCUMENTS

| | | | |
|---|---|---|---|
| 9,599,702 B1* | 3/2017 | Bordes | G01S 13/931 |
| 9,791,551 B1* | 10/2017 | Eshraghi | G01S 13/347 |
| 2013/0293411 A1* | 11/2013 | Dehlink | G01S 3/043 342/194 |
| 2015/0359521 A1* | 12/2015 | Santos | A61B 8/54 600/447 |
| 2016/0033631 A1* | 2/2016 | Searcy | G01S 7/2806 342/132 |
| 2017/0023670 A1* | 1/2017 | Jansen | G01S 7/354 |
| 2017/0054449 A1* | 2/2017 | Mani | H03M 7/4075 |

\* cited by examiner

*Primary Examiner* — Marcus E Windrich
(74) *Attorney, Agent, or Firm* — Cantor Colburn LLP

(57) ABSTRACT

A system and method for obtaining a Doppler frequency of a target are disclosed. A receiver receives a first plurality of samples of a first echo signal from the target and a second plurality of samples of a second echo signal from the target. The second plurality of samples is separated from the first plurality of samples by a time period. A phase shift is determined for the duration of the time period and the phase shift is applied to the second plurality of samples. The first plurality of samples is combined with the second plurality of samples to obtain combined samples, and the Doppler frequency for the target is obtained from the combined samples.

18 Claims, 6 Drawing Sheets

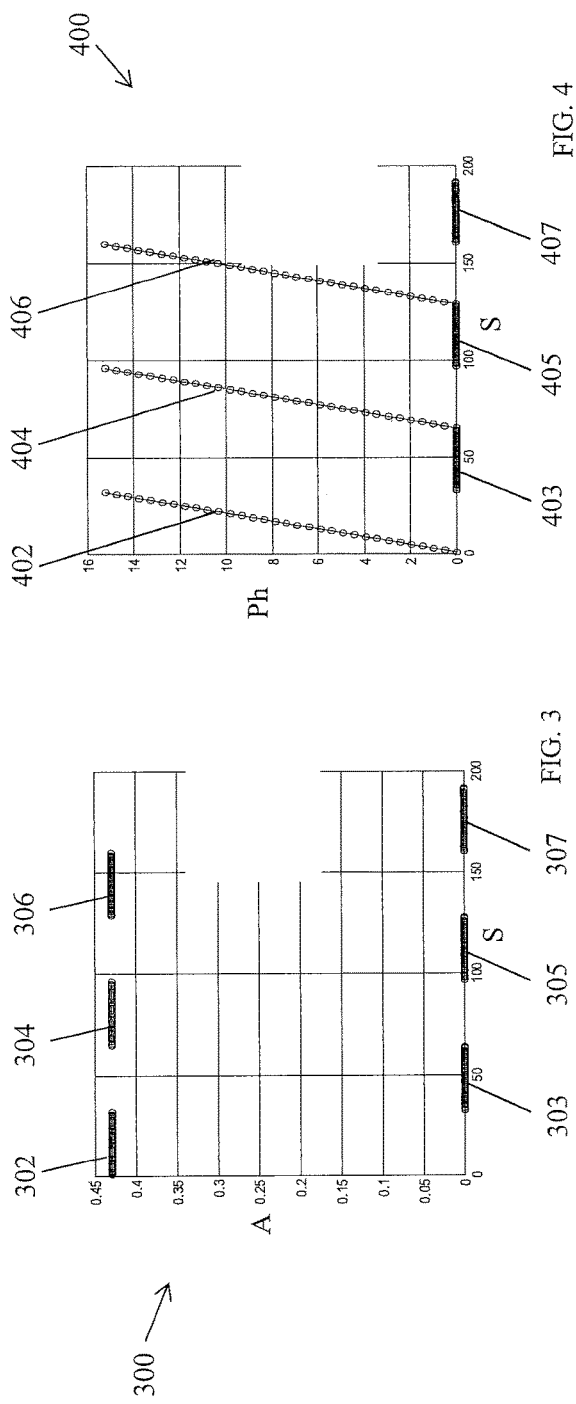
FIG. 3
FIG. 4
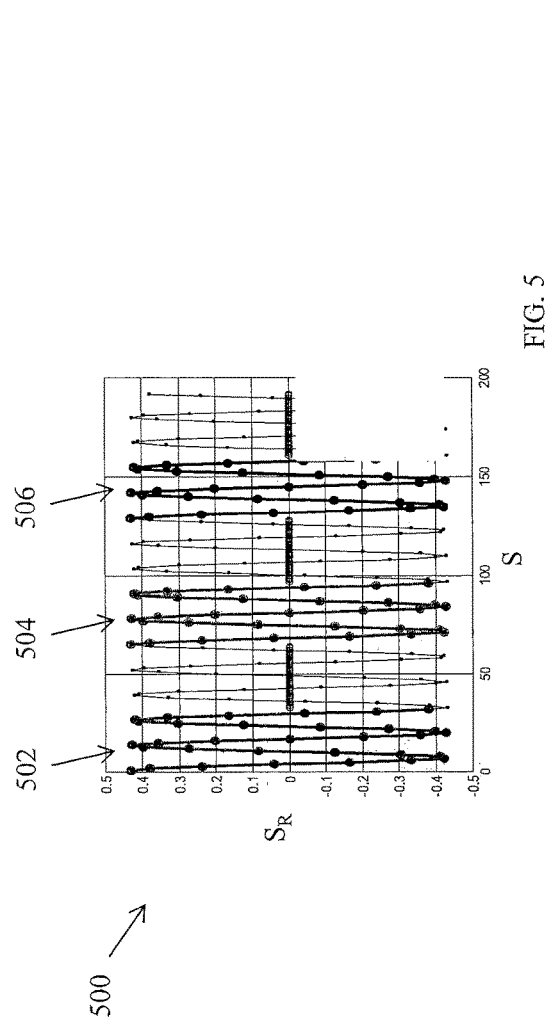
FIG. 5

DOPPLER RESOLUTION IMPROVEMENT IN LOW-DUTY CYCLE TRANSMISSION

FIELD OF THE INVENTION

The subject invention relates to a system and method for determining relative velocity using radar and, in particular, to improving a resolution for Doppler frequencies obtained in radar systems using low-duty cycle transmission rates.

BACKGROUND

Automobiles and other vehicles have come to employ safety systems which include radar technologies for detecting a location of an object or target with respect to the vehicle so that a driver or a collision-avoidance device can react accordingly. A radar system includes a transmitter for sending out a source signal and a receiver for receiving an echo or reflection of the source signal from the target. The reflected signal is sampled at a selected sampling frequency and the sampled data points are entered into a Fast Fourier Transform (FFT) in order to determine a Doppler frequency for the returning signal. A relative velocity of the target with respect to the vehicle is determined from the Doppler frequency.

The radar system transmits a series of chirp pulses, resulting in a series of echo signals. The chirp pulses are transmitted in groups known as transmission frames, with each frame including a plurality of chirp signals. In order to operate the radar system within an operational temperature range, transmission frames are separated by a down-time period having a selected duration to allowing cooling. Due to the down-time separating transmission frames, the size of the FFT that can be performed is limited to the number of echo signals obtained from a single transmission frame. It is known, however, that the more signals that are sampled, the greater the resolution of the Doppler frequency. Accordingly, it is desirable to provide a method for increasing the number of the samples that can be provided to the FFT in order to improve Doppler resolution.

SUMMARY OF THE INVENTION

In one exemplary embodiment of the invention, a method of obtaining a Doppler frequency of a target is disclosed. The method includes: obtaining a first plurality of samples of a first echo signal from the target; obtaining a second plurality of samples of a second echo signal from the target, wherein the second plurality of samples is separated from the first plurality of samples by a time period having a duration; determining a phase shift for the duration of the time period; applying the phase shift to second plurality of samples; combining the first plurality of and the second plurality of samples; and obtaining the Doppler frequency for the target from the combined samples.

In another exemplary embodiment of the invention, a system is disclosed for obtaining a Doppler frequency of a target. The system includes a receiver for receiving a first plurality of samples of a first echo signal from the target and a second plurality of samples of a second echo signal from the target, wherein the second plurality of samples is separated from the first plurality of samples by a time period having a duration; and a processor. The processor is configured to: determine a phase shift for the duration of the time period, apply the phase shift to second plurality of samples, combine the first plurality of and the second plurality of samples, and obtain the Doppler frequency for the target from the combined samples.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 shows a graph illustrating the amplitudes for samples obtained over the duration of the frames of FIG. 2;

FIG. 4 shows a graph illustrating the phases for the samples of FIG. 2;

FIG. 5 shows a graph illustrating the real part of samples for signals obtained over the duration of the frames of FIG. 2;

DESCRIPTION OF THE EMBODIMENTS

Figure 1:
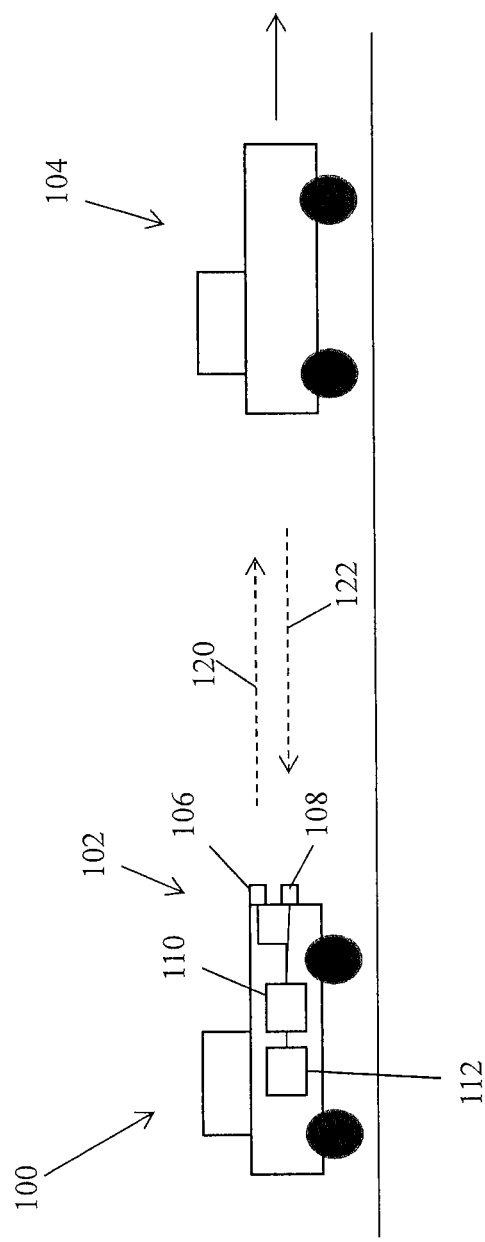
FIG. 1 shows a vehicle that includes a radar system suitable for determining relative velocity of an object or target with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining relative velocity of an object or target 104 with respect to the vehicle 100. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 including a processor on-board the vehicle 100 controls and operates the transmitter 106 to generate a radio frequency wave (a "source signal" 120). In one embodiment, the source signal 120 includes a linear frequency-modulated continuous wave (LFM-CW), often referred to as a chirp signal. Alternatively, the source signal 120 can be a pulsed signal or a combination of pulsed and chirp signals. In one embodiment, the transmitter 106 transmits a sequence of transmission frames separated by down-time periods, with each transmission frame including a plurality of chirp signals. A reflection of the source signal 120 from the target 104 is referred to herein as an echo signal 122. The echo signal 122 is received at the receiver 108, which generally includes circuitry for sampling the echo signal 122. The control unit 110 performs a Fast Fourier Transform (FFT) on the sampled signal to obtain frequencies in a frequency space in order to determine a frequency of the echo signal 122 and thus a Doppler frequency for the target 104. The Doppler frequency is used to estimate the relative velocity of the target 104 with respect to the vehicle 100.

Knowledge of the relative velocity of the target 104 with respect to the vehicle 100 is used to maneuver the vehicle 100 by, for example, accelerating or decelerating the vehicle 100 or steering the vehicle to avoid the target 104. In one embodiment, the control unit 110 cooperates with a collision-avoidance system 112 to control steering and acceleration/deceleration components to perform necessary maneuvers at the vehicle 100 to avoid the target 104. In another embodiment, the control unit 110 provides a signal to alert a driver of the vehicle 100 so that the driver can take necessary actions to avoid the target 104.

While the radar system 102 is discussed herein as being on-board a vehicle 100, the radar system 102 may also be part of an immobile or stationary object in alternate embodiments. Similarly, the target 104 can be a vehicle or moving object or it can be an immobile or stationary object.

Figure 2:
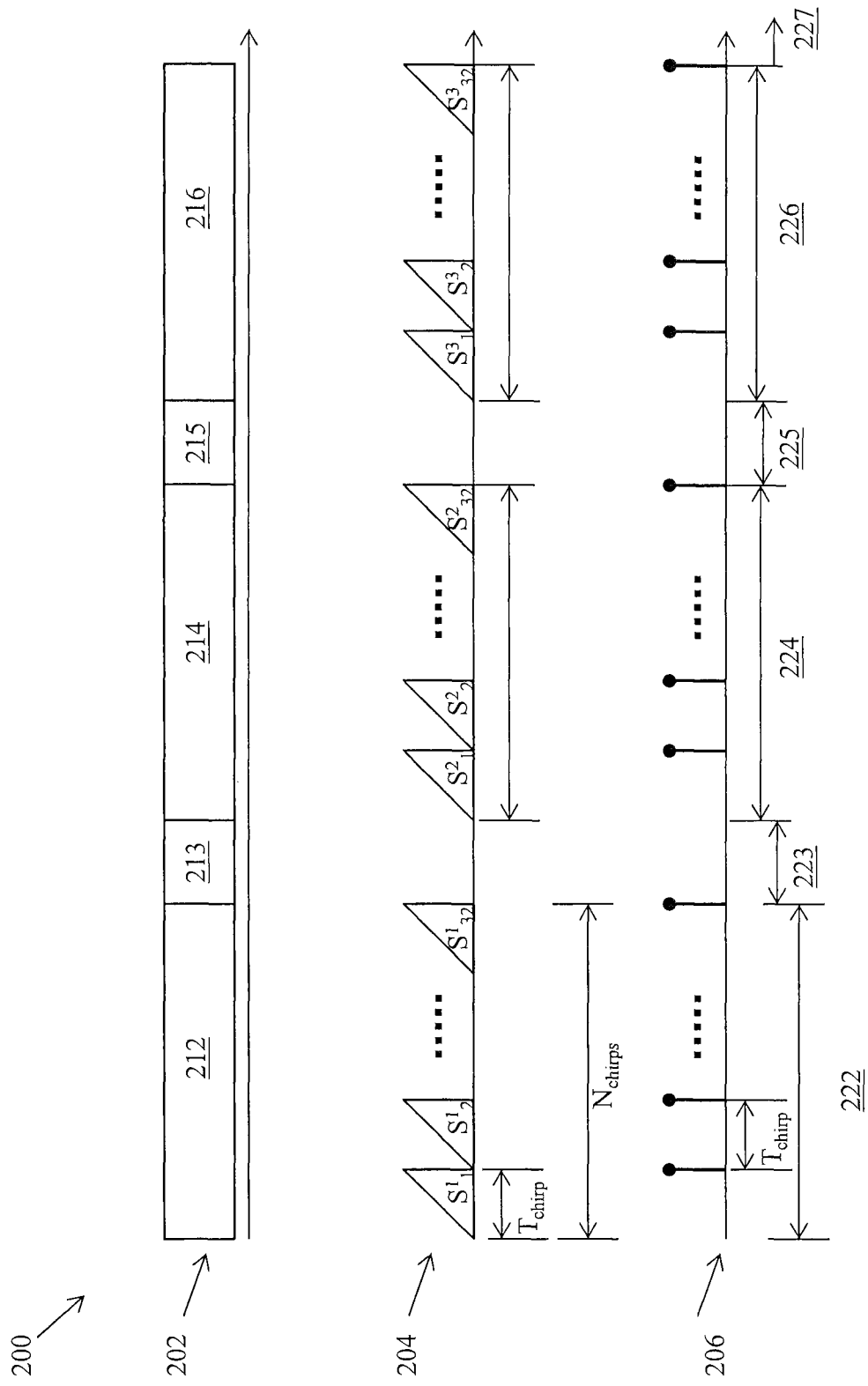
FIG. 2 shows a time diagram illustrating transmission signals and echo signals obtained by operation of a radar system in accordance with one embodiment of the invention.

FIG. 2 shows a time diagram 200 illustrating transmission signals and echo signals obtained by operation of radar system 102 in accordance with one embodiment of the invention. The top row 202 shows a sequence of transmission frames separated by down-time periods. First transmission frame 212, second transmission frame 214 and third transmission frame 216 are shown sequentially in time and are separated by down-time periods 213 and 215. First transmission frame 212 is separated from second transmission frame 214 by down-time period 213. Second transmission frame 214 is separated from third transmission frame 216 by down-time period 215. While FIG. 2 shows three transmission frames for illustrative purposes, a transmission of signals may include any number of transmission frames in alternative embodiments.

Each of the transmission frames 212, 214 and 216 includes a plurality of chirp signals. The second row 204 shows chirp signals of the transmission frames 212, 214 and 216 in one embodiment of the invention. First transmission frame 212 includes 32 chirp signals (labelled $S^1_1$ through $S^1_{32}$). Second transmission frame 214 includes 32 chirp signals (labelled $S^2_1$ through $S^2_{32}$) and third transmission frame 216 includes 32 chirp signals (labelled $S^3_1$ through $S^3_{32}$). While 32 chirp signals are shown within each transmission frame for illustrative purposes, any number of chirp signals (that are powers of 2) may occur within a transmission frame. In general, the number of chirp signals is the same for each transmission frame. Each chirp signal lasts for a time duration indicated by $t_{Chirp}$, and chirp signals within a transmission frame follow each other substantially without a pause.

The bottom row 206 shows sampled signals generated as a result of reflection of the chirp signals of the second row 204 from a target, such as target 104 of FIG. 1. Three sample frames 222, 224 and 226 including sample signals are shown corresponding to the transmission frames 212, 214 and 216 respectively. First sample frame 222 is followed by second sample frame 224 after a down-time period 223 having duration $T_{pause}$. Second sample frame 224 is followed by third sample frame 226 after a down-time period 225 having duration $T_{pause}$. Down-time period 227 follows third sample frame 226. Each sample signal in bottom row 206 is created in response to a chirp signal in second row 204. Within a sample frame, sample signals are separated in time by the duration of the chirp signal, $t_{Chirp}$.

FIG. 3 shows a graph 300 illustrating the amplitudes for samples obtained over the duration of the frames of FIG. 2. First set of amplitudes 302 represent the amplitudes of samples from first sample frame 222. Similarly, a second set of amplitudes 304 represent the amplitudes of samples from second sample frame 224, and a third set of amplitudes 306 represent the amplitudes of samples from the third frame 226. The first set of amplitudes 302, second set of amplitudes 304 and third set of amplitudes 306 are all of about equal intensity. Amplitudes 303, 305 and 307 are zero during the down-time periods 223, 225 and 227.

FIG. 4 shows a graph 400 illustrating the phases for the samples of FIG. 2. First set of phases 402 represents the phases of samples from the first sample frame 222. Similarly, a second set of phases 404 represents the phases of samples from the second sample frame 224, and a third set of phases 406 represents the phases of samples from the third sample frame 226. The first set of phases 402 begins at zero for the first sample and increases linearly for each successive sample. The phases of the second set of phases 404 and third set of phases 406 also change in the linear fashion described with respect to the first set of phases 402. Phases 403, 405 and 407 are zero during the down-time periods 223, 225 and 227.

FIG. 5 shows a graph 500 illustrating the real part of samples for signals obtained over the duration of the frames of FIG. 2. Waveforms 502, 504 and 506 are shown for sample frames 222, 224 and 226, respectively. Waveform 502 can be determined from the first set of amplitudes 302 and first set of phases 402. Similarly, waveform 504 can be determined from the second set of amplitudes 304 and second set of phases 404, and waveform 506 can be determined from the third set of amplitudes 306 and third set of phases 406. Waveforms have been filled in for the down-time period between frames based on interpolation.

Figure 6:
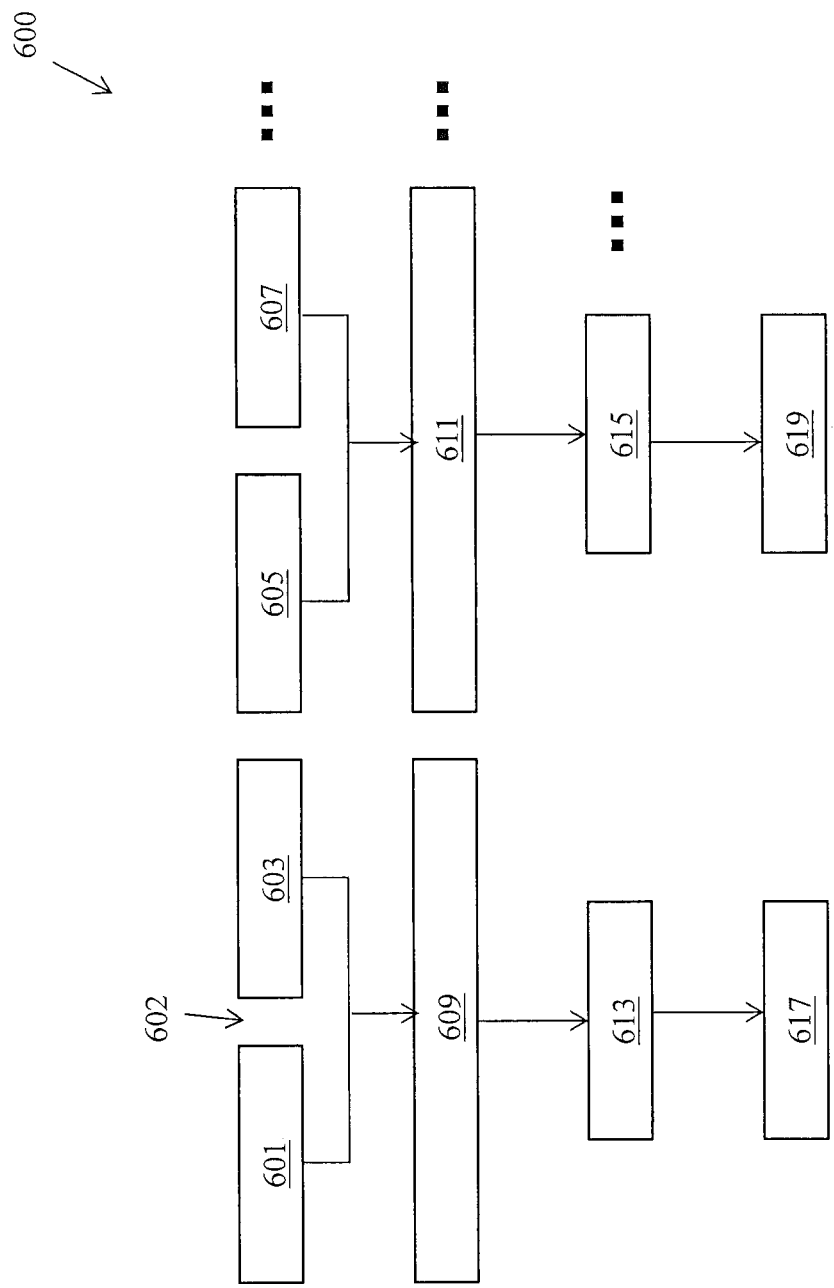
FIG. 6 illustrates a method for improving a resolution for a Doppler frequency of sampled signals in one embodiment of the invention.

FIG. 6 illustrates a method 600 for improving a resolution for a Doppler frequency of sampled signals in one embodiment of the invention. The method includes combining a first frame (e.g., Frame 1, 601) of samples and an adjacent second frame (e.g., Frame 2, 603) of samples, each frame having k samples, to create a combined or concatenated frame 609 of samples having 2*k samples. An FFT 613 is then performed on the combined frame of samples, whereas the size of the FFT is 2*k, to obtain a Doppler frequency (617). This process can be repeated on subsequent frames, as shown with frames 605 and 607 being combined into a frame 611 of size 2*k and FFT 615 being performed on frame 611 to obtain Doppler frequency (619).

In order to combine the first frame 601 and second frame 603 to form frame 609, a phase shift due to the down-time period 602 between the first frame 601 and second frame 603 is taken into account and the down-time period 602 is removed from between first frame 601 and second frame 603. The phase shift is generally applied to samples of the second frame 603 so that when the first frame 601 and the second frame 603 are combined, there is little or no discontinuity in the phases between last sample of the first frame 601 and first sample of the second frame 603.

Figure 7:
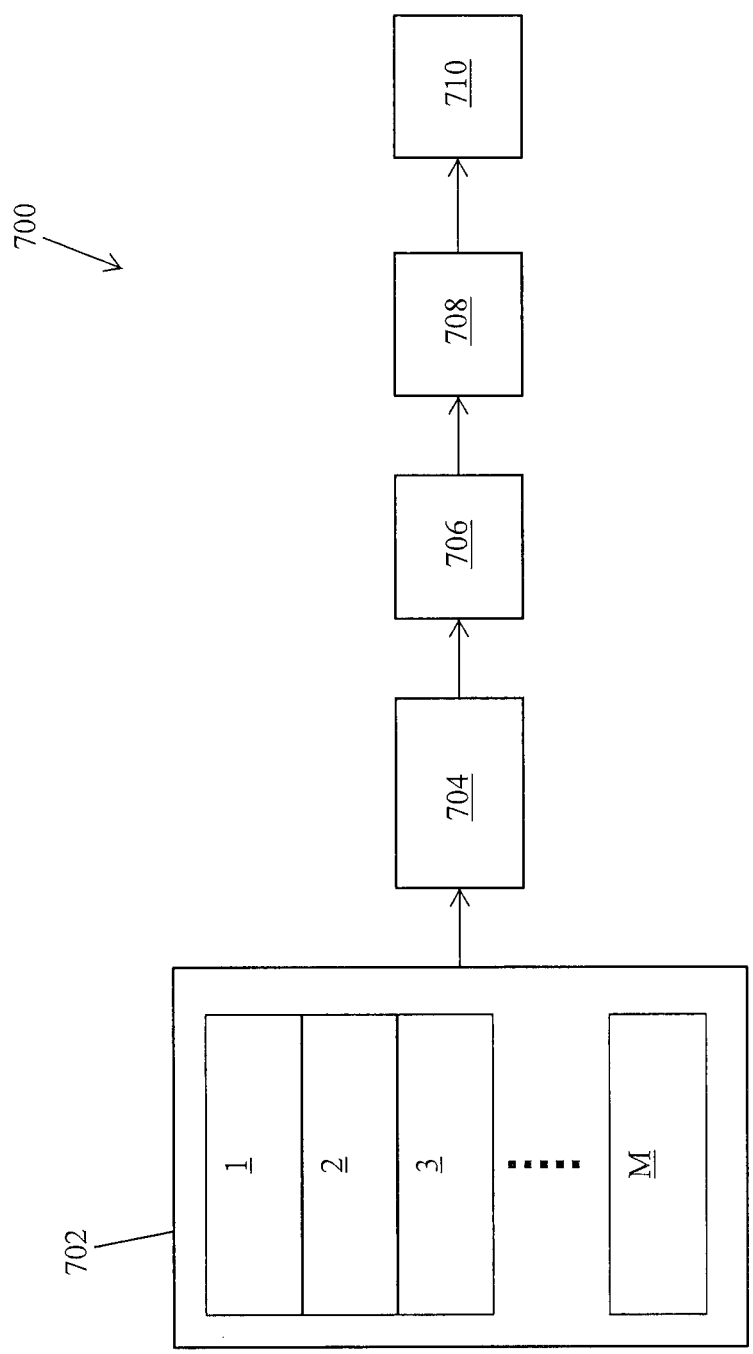
FIG. 7 shows a flowchart illustrating the method disclosed herein for improving a resolution for a Doppler frequency of sampled signals in one embodiment of the invention.

FIG. 7 shows a flowchart 700 illustrating the method disclosed herein for improving a resolution for a Doppler frequency of sampled signals in one embodiment of the invention. Box 702 schematically shows a collection of M frames of samples, with each frame having k samples therein.

Box 704 shows a calculation method for determining a phase shift due to the down-time period 602. The duration of the down-time period 602 is measured as an integral number $N=N_{chirp}$ of chirps with each chirp signal having duration $T=t_{Chirp}$. The phase shift is calculated using Eq. (1) below:

$$\text{Phase}=\exp(j2\pi*Ftr*T*N) \quad \text{Eq. (1)}$$

wherein the frequency Ftr can be determined by performing an FFT on a frame of samples having size k, such as the first frame 601 of samples. The frequency Ftr determined from the first frame 601 may be used as a good first estimate for determining the phase shift. The frequency Ftr can be recalculated at later steps. For example, Ftr can be determined from the FFT 113 of combined frame (i.e., frame 609). In one embodiment, frames 601 and 603 can be recombined using the value of Ftr determined from FFT 113. Alternatively, the value of Ftr determined from FFT 613 can be used when combining frames 605 and 607.

In Box 706, adjacent frames are combined. The samples from a first frame (e.g., frame 601) are concatenated with the samples of its subsequent frame (e.g., frame 603). In Box 708, an FFT of size 2*k is performed on the combined frame. In Box 710, a frequency of the sampled signals is determined. The Doppler frequency is subsequent determined.

Figure 8:
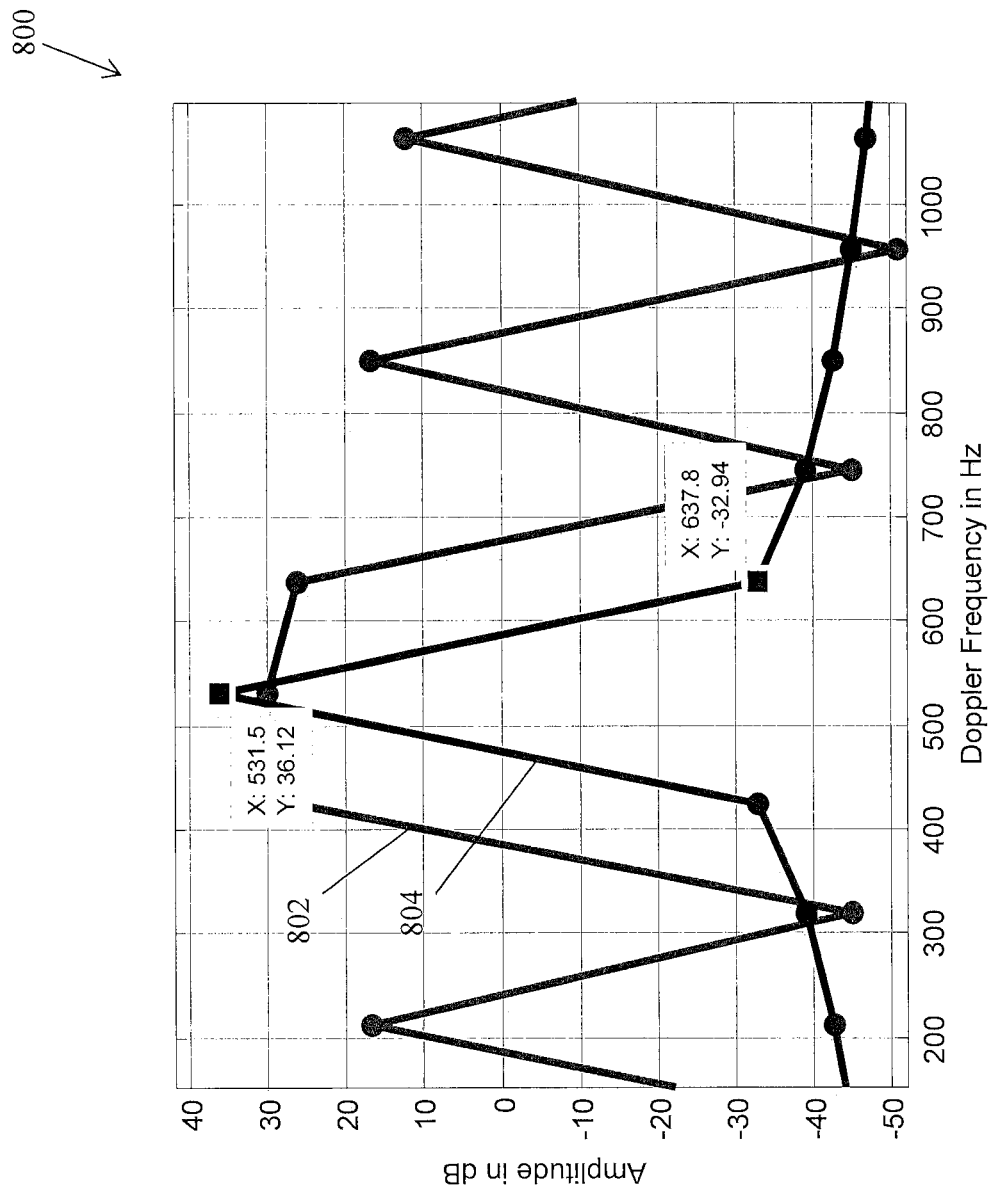
FIG. 8 shows a graph of exemplary frequency curves obtained using different Fast Fourier Transform sample sizes.

FIG. 8 shows a graph 800 of exemplary frequency curves obtained using different FFT sample sizes. Curve 802 shows a frequency curve that is obtained using a single frame that includes 32 samples. The frequency peak at about 520 Hertz (Hz) is broad and the size of side lobes of curve 802 is comparable to the size of the frequency peak. Curve 804 shows a frequency curve obtained using the methods disclosed herein of concatenating adjacent sample frames. The peak at about 520 Hz is narrower than the peak of curve 802, thus providing better resolution of frequency. Additionally, side lobes of curve 804 are significantly smaller than the peak of curve 804 and therefore do not interfere with frequency determination for curve 804.

The methods disclosed herein improve the ability of a radar system to distinguish react to a target. The improved Doppler frequency measurements provide a improved value of relative velocity, which can be provided to the driver or collision avoidance system in order for the driver or collision avoidance system to have improved reaction in avoiding the target, thus increasing a safety of the driver and vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of obtaining a Doppler frequency of a target, comprising:
   obtaining a first plurality of samples of a first echo signal from the target;
   obtaining a second plurality of samples of a second echo signal from the target, wherein the second plurality of samples is separated from the first plurality of samples by a time period having a duration;
   shifting the second plurality of samples with respect to the first plurality of samples by the time period to combine the first plurality of samples and the second plurality of samples;
   determining a phase shift corresponding to a duration of the time period for a frequency of the first echo signal determined from the first plurality of samples;
   applying the phase shift to the second plurality of samples to remove a discontinuity between a phase of the last sample of the first plurality of samples and a phase of the first sample of the second plurality of samples; and
   obtaining the Doppler frequency for the target from the combined samples.

2. The method of claim 1, wherein the first plurality of samples includes k samples and the second plurality of samples includes k samples and the combined samples includes 2k samples.

3. The method of claim 1, wherein combining the first plurality of samples and the second plurality of samples further includes removing the time period.

4. The method of claim 3, wherein applying the phase shift to the second plurality of samples corrects for the effect of removing the time period.

5. The method of claim 1, wherein combining the first plurality of samples and the second plurality of samples further includes concatenating the first plurality of samples and the second plurality of samples.

6. The method of claim 1, further comprising performing an FFT on the combined plurality of samples to obtain the Doppler frequency.

7. The method of claim 1, further comprising determining a relative velocity of the target from the Doppler frequency.

8. The method of claim 7, further comprising maneuvering a vehicle with respect to the target based on the relative velocity.

9. The method of claim 1, wherein the first plurality of samples is a reflection from the target of a plurality of chirp signals transmitted during a first transmission frame from the target and the second plurality of samples is a reflection from the target of a plurality of chirp signals transmitted during a second transmission frame.

10. A system for obtaining a Doppler frequency of a target, comprising:
    a receiver for receiving a first plurality of samples of a first echo signal from the target and a second plurality of samples of a second echo signal from the target, wherein the second plurality of samples is separated from the first plurality of samples by a time period having a duration; and
    a processor configured to:
       shift the second plurality of samples with respect to the first plurality of samples by the time period to combine the first plurality of samples and the second plurality of samples,
       determine a phase shift corresponding to a duration of the time period for a frequency of the first echo signal determined from the first plurality of samples,
       apply the phase shift to the second plurality of samples to remove a discontinuity between a phase of the last sample of the first plurality of samples and a phase of the first sample of the second plurality of samples, and
       obtain the Doppler frequency for the target from the combined samples.

11. The system of claim 10, wherein the first plurality of samples includes k samples and the second plurality of samples includes k samples and the combined samples includes 2k samples.

12. The system of claim 10, wherein the processor is further configured to combine the first plurality of samples and the second plurality of samples to remove the time period.

13. The system of claim 12, wherein applying the phase shift to the second plurality of samples corrects for the effect of removing the time period.

14. The system of claim 10, wherein the processor is further configured to combine the first plurality of samples and the second plurality of samples by concatenating the first plurality of samples and the second plurality of samples.

15. The system of claim 10, wherein the processor is further configured to perform an FFT on the combined plurality of samples to obtain the Doppler frequency.

16. The system of claim 10, wherein the processor is further configured to determine a relative velocity of the target from the Doppler frequency.

17. The system of claim 16, wherein the processor is further configured to maneuver a vehicle with respect to the target based on the relative velocity.

18. The system of claim 10, wherein the first plurality of samples is a reflection from the target of a plurality of chirp signals transmitted by a transmitter during a first transmission frame and the second plurality of samples is a reflection from the target of a plurality of chirp signals transmitted by the transmitter during a second transmission frame.

\* \* \* \* \*